US006223833B1

(12) United States Patent
Thurler et al.

(10) Patent No.: US 6,223,833 B1
(45) Date of Patent: May 1, 2001

(54) SPINDLE LOCK AND CHIPPING MECHANISM FOR HAMMER DRILL

(75) Inventors: James E. Thurler, Pickens, SC (US); John E. Nemazi, Bloomfield Hills; Ralph E. Smith, Lake Orion, both of MI (US)

(73) Assignee: One World Technologies, Inc., Anderson, SC (US)

( * ) Notice: Subject to any disclaimer, the term of this patent is extended or adjusted under 35 U.S.C. 154(b) by 0 days.

(21) Appl. No.: 09/325,443

(22) Filed: Jun. 3, 1999

(51) Int. Cl.[7] .......................... B23B 45/02

(52) U.S. Cl. .......................... 173/48; 173/109; 173/114; 173/205; 173/216

(58) Field of Search .......................... 173/48, 47, 104, 173/109, 117, 114, 205, 22 A, 22 R, 216; 74/22 A, 22 R

(56) References Cited

U.S. PATENT DOCUMENTS

| | | | | |
|---|---|---|---|---|
| Re. 35,372 | * | 11/1996 | Houben et al. | 173/109 |
| 3,334,694 | * | 8/1967 | Schnettler | 173/109 |
| 3,430,708 | * | 3/1969 | Miller | 173/109 |
| 3,680,642 | * | 8/1972 | Kirn et al. | 173/48 |
| 3,685,594 | * | 8/1972 | Koehler | 173/109 |
| 3,785,443 | * | 1/1974 | Armbruster | 173/48 |
| 3,789,933 | | 2/1974 | Jarecki | 173/48 |
| 3,794,124 | * | 2/1974 | Biersack | 173/117 |
| 3,876,014 | * | 4/1975 | Moores, Jr. | 173/47 |
| 3,955,628 | | 5/1976 | Grozinger et al. | 173/48 |
| 4,098,351 | | 7/1978 | Alessio | 173/48 |
| 4,158,313 | * | 6/1979 | Smith | 173/47 |
| 4,236,588 | | 12/1980 | Moldan et al. | 173/48 |
| 4,418,766 | * | 12/1983 | Grossman | 173/48 |
| 4,529,044 | | 7/1985 | Klueber et al. | 173/48 |
| 4,763,733 | | 8/1988 | Neumaier | 173/48 |
| 5,415,240 | | 5/1995 | Mundjar | 173/48 |
| 5,447,205 | | 9/1995 | Thurler | 173/48 |
| 5,653,294 | | 8/1997 | Thurler | 173/48 |

OTHER PUBLICATIONS

Milwaukee Thunderbolt Rotary Hammer Sales Catalog, 2 pages, 1996.

Makita Rotary Hammer Brochure, 2 pages, no date.

* cited by examiner

*Primary Examiner*—Peter Vo
*Assistant Examiner*—Jim Calve
(74) *Attorney, Agent, or Firm*—Brooks & Kushman P.C.

(57) ABSTRACT

A hammer drill has a motor which drives an axially displaceable intermediate gear mounted in an intermediate gear arrangement. An impact mechanism is formed by including interacting impact cams between either the intermediate gear and the housing, or the motor armature shaft and the housing to generate a reciprocating motion on an output spindle or shaft. A spindle locking mechanism is included which causes an intermediate gear to be disengageable with respect to the output shaft, while still permitting the impact mechanism to be engaged. Such an arrangement allows the hammer drill to operate in a hammer-only or chipping mode.

3 Claims, 3 Drawing Sheets

SPINDLE LOCK AND CHIPPING MECHANISM FOR HAMMER DRILL

TECHNICAL FIELD

The present invention relates to hammer drills, and more particularly, to a hammer drill capable of achieving high blows per minute relative to the output shaft speed.

BACKGROUND ART

When drilling through hard surfaces such as rocks or stone, many times it is desirable to impart a reciprocating motion to the drill bit to facilitate drilling. This hammering motion of the drill bit helps break up the material while the rotating of the drill bit allows the broken up material to be removed from the hole being drilled.

A conventional hammer drill has a motor disposed in a housing, and the motor includes an armature shaft having a pinion at its end. The pinion drives a suitably arranged set of gears to rotate the output shaft. A drill chuck is mounted on the output spindle to receive a drill bit.

In conventional designs, the impact mechanism which provides the hammering action is typically associated with the face of an output gear connected to the output shaft. More specifically, a ratchet face or similar mechanism on the face of the output gear abuts a cooperating mechanism that is affixed to the drill housing. A reciprocating motion is then imparted to the drill bit when the output shaft rotates.

It is also well known in the art to provide hammer drills with the capability to switch between a conventional drilling mode, with rotation only, and a hammer drilling mode employing conventional drill rotation along with a hammer action. The hammer drill is capable of switching between the two modes, and thus eliminates the need for a separate conventional drill. An example of an adjustment mechanism for switching between conventional drilling mode and hammer drilling mode is disclosed in U.S. Pat. No. 5,447,205 assigned to the assignee of the present invention which is incorporated herein by reference.

A primary disadvantage associated with existing impact mechanisms for hammer drills is the fact that in order to accomplish a desired high blows per minute (BPM) for efficient hammer drill performance, an undesirable high output speed is required. High BPM can also be achieved by increasing the number of ramps on the impact mechanism. However, an increased number of impact ramps tends to produce a "skipping" effect and efficiency loss due to the smaller area of surface contact for each ramp.

One solution which achieves both high BPMs without a corresponding need to increase output speed is disclosed in commonly owned U.S. Pat. No. 5,653,572, and which is also incorporated herein by reference. More specifically, an intermediate gear of a two stage gear reduction arrangement is made axially displaceable and associated with a first cam mechanism for generating a reciprocating (i.e., hammer) motion. An output face is engageable with an impact face of an output gear. Engagement of the output and impact faces transmits axial displacement between the intermediate and output gears. A second cam mechanism is affixed to the housing and axially spaced from the first cam mechanism. The first and second cam mechanisms are engageable by sufficiently axially displacing the output shaft so that the output gear impact face abuts the intermediate gear output face while the first and second cam mechanisms abut each other. The first and second cam mechanisms are configured to generate reciprocating motion and cause the intermediate gear to reciprocate axially as the first cam mechanism rotates relative to the second cam mechanism, which is then transmitted to the impact face of the output gear to axially reciprocating the output shaft as it rotates.

While this arrangement satisfactorily divorces the relationship between the output shaft speed and the BPMs of the hammer action, the use of high speed motors in some drill applications, such as the high speed motors typically employed in cordless drills, requires very high reduction in speed between the drive shaft of the motor and the output shaft which rotates the chuck. A two stage gear reduction arrangement may not be suitable for such high gear reduction applications. As such, a need still exists for a hammer drill hammer mechanism which produces high BPMs without a concomitant increase in output shaft speed while also providing the ability to achieve a high gear reduction.

In addition, it is known to include a spindle locking arrangement in industrial hammer drills to prevent rotation of the output shaft while allowing the hammering action to take place. Such arrangements advantageously allow a hammer drill to operate in a third hammer only or "chipping" mode.

For example, U.S. Pat. No. 5,415,240 (Mundjar) discloses a hammer drill employing a percussion piston/striking bar hammer arrangement driven by a rotary fluid valve. Switching between a hammer, hammer/drill, and drill mode is achieved by axial movement of a pinion gear attached to the motor shaft. U.S. Pat. No. 3,955,628 (Grozinger et al) discloses a hammer drill which can be selectively switched between a hammer, hammer/drill, and drill mode by use of a cam to axially displace the output shaft to cause engagement of a hammer disk with an impact member, and a coupling member into engagement with stationary cutout. In U.S. Pat. No. 3,789,933 (Jarecki), a hammer drill is disclosed which can be selectively switched between a hammer, hammer/drill, and drill mode by use of a coupler and an axially moveable external locking collar. This arrangement acts directly on the output shaft to control rotation thereof. Finally, U.S. Pat. No. 4,236,588 (Moldan et al) and U.S. Pat. No. 4,763,733 (Neumaier) both provide hammer drills which utilize separate rotary and hammer drive mechanisms. Both arrangements also use an axially displaceable coupling sleeve to switch between rotation of the output shaft and rotation locking. Moldan '588 also discloses an intermediate mode wherein the output shaft is freely rotatable but not engaged.

While such arrangements provide hammer drills capable of operating in a hammer only mode of operation, either independent hammer and rotation drive systems are employed which undesirably increase the size, weight, and cost of the drill, or complex mechanical spindle locking arrangements are used when the hammer and rotation motions are driven by a single motor. In addition, such common drive arrangements all suffer from the inability to achieve a high BPMs without a corresponding increase in output speed, as described above.

Thus, a need exists for a hammer drill capable of operating in a third hammer only mode which utilizes a simple spindle locking arrangement, while also allowing a high BPM without a corresponding increase in output shaft speed.

DISCLOSURE OF THE INVENTION

It is, therefore, an object of the present invention to provide a hammer drill capable of generating a high blows per minute (BPM) without requiring an undesirable high output speed in combination with a high reduction gearing arrangement.

It is another object of the present invention to provide a hammer drill capable of generating a high blows per minute (BPM) without requiring an undesirable high output speed which further includes a simple spindle locking arrangement to allow the hammer drill to operate in a hammer only chipping mode.

In accordance with these and other objects and features of the present invention, a hammer drill is provided with an impact mechanism for generating a reciprocating action on an output shaft. A chuck is attached to the end of the output shaft for attachment of various types of tool bits. The hammer drill includes a motor for driving an intermediate gear stage. The intermediate gear stage includes an axially displaceable gear element arranged therein to form a spindle locking mechanism which permits selective control of whether the output shaft is driven in either a reciprocating motion only setting, or a combined rotational and reciprocating motion setting. In addition, a mechanism is provided to selectively disengage the output shaft from interacting with the impact mechanism to allow driving of the output shaft in a rotational motion only setting.

In accordance with one embodiment of the present invention, a hammer drill capable of operation in a hammer drill mode, a drill-only mode, and a chipping mode is provided having a housing, a motor disposed in the housing and having a rotatable armature shaft and an armature pinion located at one end thereof, and an axially displaceable output shaft having an outer end adapted to receive a drill chuck. An output gear is fixed about the output shaft to rotate coaxially therewith, and an intermediate gear reduction arrangement is provided having at least a first gear engageable with the armature pinion, an axially displaceable second gear engageable to drive the output gear, and a rotation control mechanism for selectively moving the second gear into and out of driving engagement with the output gear. An axially displaceable first cam mechanism is positioned to be driven by the armature shaft, and a second cam mechanism is affixed to the housing. The first and second cam mechanisms are arranged to be engageable by selectively displacing the first cam mechanism to cause the first and second cam mechanisms to abut each other, wherein the first and second cam mechanisms are configured with respect to each other and the intermediate gear reduction arrangement to generate reciprocating motion in response to rotation of the armature shaft and cause the intermediate gear reduction arrangement to transmit the reciprocating motion to the output gear thereby axially reciprocating the output shaft irrespective of whether the second gear and the output gear are in rotational engagement.

In accordance with another embodiment of the present invention, the intermediate gear reduction arrangement includes a first planetary gear set having a sun gear driven by the armature pinion gear and an outer gear for driving the sun gear of a second planetary gear set. The second planetary gear set includes a sun gear and an outer gear for driving the output gear to cause the output shaft to rotate.

In accordance with a further aspect of this embodiment, the sun gear of the second planetary gear set can form the axially displaceable second gear if a chipping mode is desired, such that rotation of the output shaft can be prevented by selectively moving the axially displaceable sun gear out of engagement with the outer gear of the second planetary gear set. In this embodiment, the first impact cam mechanism is located on the armature pinion.

In accordance with a further embodiment of the present invention, the intermediate gear reduction arrangement includes a two stage gear reduction arrangement having a first intermediate shaft to which the second gear is affixed. If a chipping mode is desired, the first intermediate shaft can be arranged to be axially displaceable to move the second gear out of engagement with the output gear to prevent rotation of the output shaft. In this embodiment, the first cam mechanism is located on the armature shaft.

In still another embodiment of the present invention, the intermediate gear reduction arrangement comprises a three stage gear reduction arrangement having a second intermediate shaft to which the second gear is affixed. If chipping mode is desired, the second intermediate shaft is axially displaceable to move the second gear out of engagement with the output gear to prevent rotation of the output shaft. The three stage gear reduction arrangement further comprises a first intermediate shaft to which the first gear is affixed. The first cam mechanism is located on the first gear, and the first intermediate shaft is axially displaceable to move the first and second cam mechanisms into and out of engagement.

The advantages accruing to the present invention are numerous. For example, the present invention allows a desired high blows per minute (BPM) for efficient hammer drill performance without a concomitant high output shaft speed or costly two-speed gear train to be used with high speed motors such as employed in cordless dill applications. In addition, the use of a simple spindle locking mechanism allows the hammer drill to be used in a chipping or chiseling mode.

The above objects and other objects, features, and advantages of the present invention will be readily appreciated by one of ordinary skill in the art from the following detailed description of the best mode for carrying out the invention when taken in connection with the accompanying drawings.

BEST MODE FOR CARRYING OUT THE INVENTION

Figure 1:
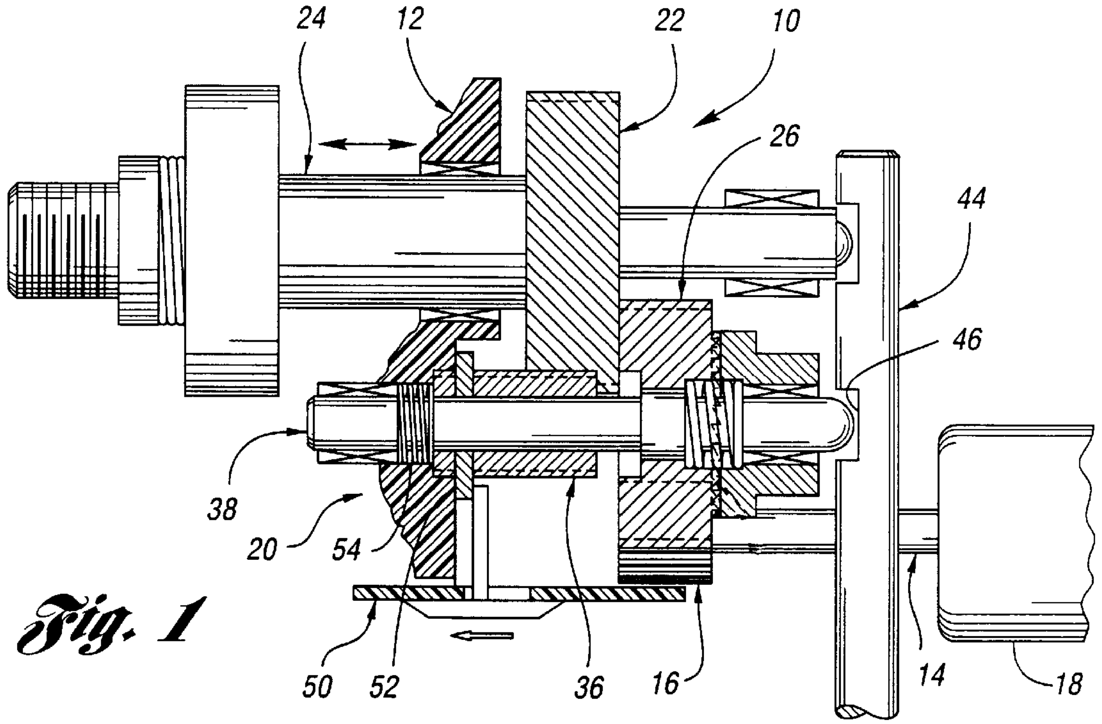
FIG. 1 is a side view schematic representation of a hammer drill in a spindle locked, hammer only mode in accordance with a first embodiment of the present invention.
Figure 2:
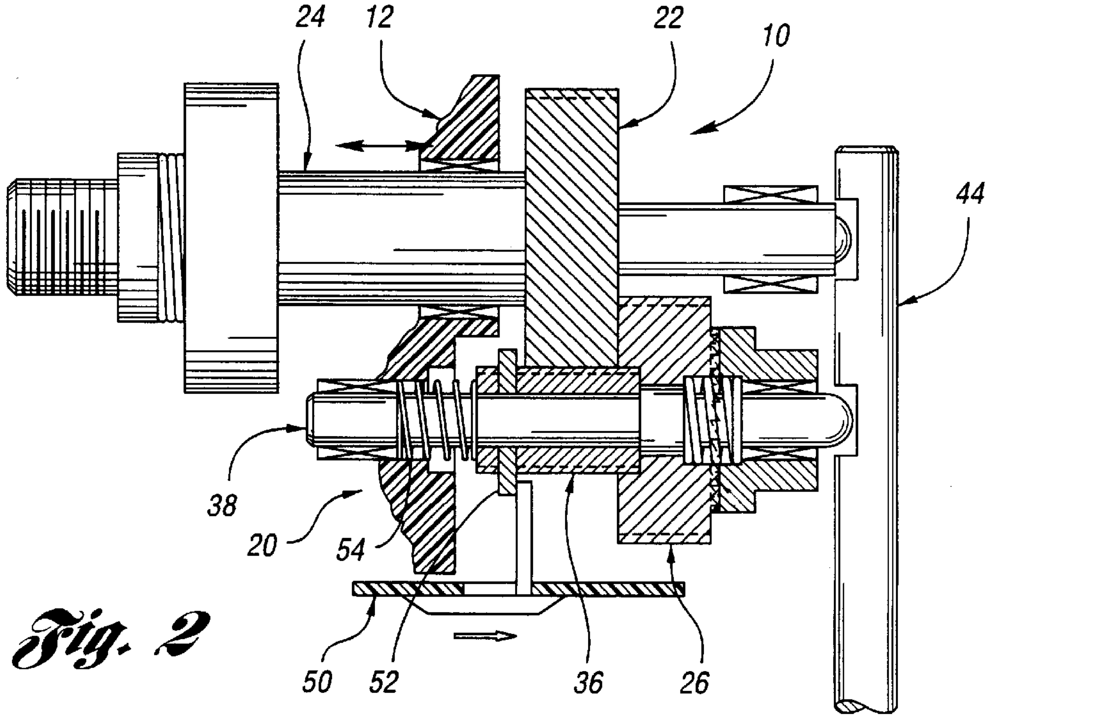
FIG. 2 is a side view schematic representation of the hammer drill of FIG. 1 switched into a combination hammer and drill mode.
Figure 3:
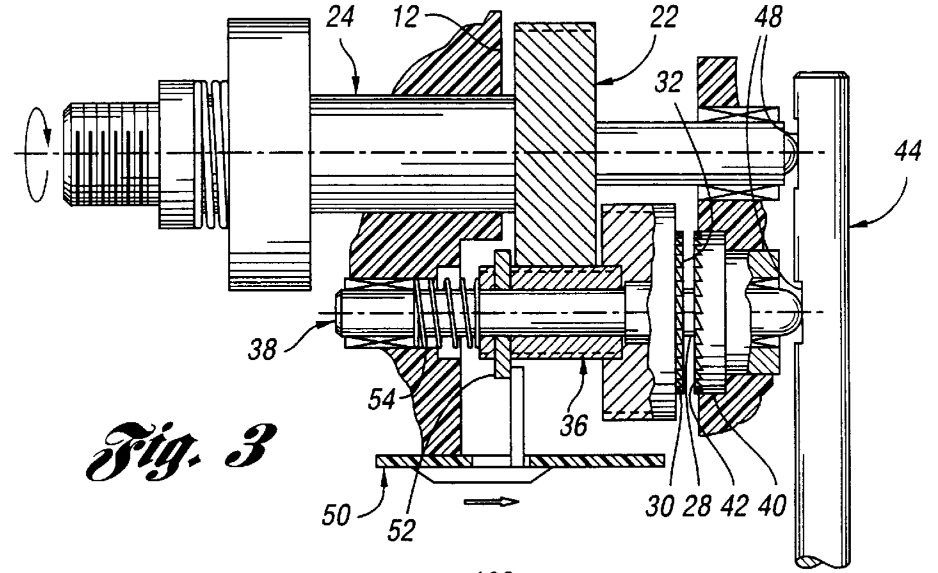
FIG. 3 is a side view schematic representation of the hammer drill of FIG. 1 switched into a drill only mode.

Referring now to FIGS. 1–3, a hammer drill in accordance with a first of the present invention is generally indicated at 10. The hammer drill 10 would include a housing 12 preferably formed with a pistol grip handle (not shown).

A motor driven armature shaft 14 (shown only in FIG. 1 for illustrative purposes) includes an armature pinion 16 located at an outer end thereof and a drive motor 18 at the other end. The armature shaft is supported at a forward portion by a ball bearing which is secured in place and supported by a bearing plate affixed to the housing as is well understood in the art.

An intermediate gear assembly, generally indicated at 20, operatively connects armature pinion 16 to an output gear 22 to drive a spindle shaft or output shaft 24. Output gear 22 is fixed about a midsection of output shaft 24 to rotate coaxially with the output shaft about its axis of rotation. The outer end of output shaft 24 attaches to a conventional drill chuck 34 (as shown in FIGS. 4–7) adapted to retain a tool bit (not shown) that engages various workpieces.

An impact mechanism for hammer drill 10 is formed from an axially displaceable intermediate shaft input gear 26 mounted on an intermediate shaft 28 and driven by armature pinion 16. Intermediate shaft input gear 26 includes an input face and an output face. The input face is associated with a first cam mechanism 30 (best seen in FIG. 3), such as a plurality of angularly spaced apart impact ramps 32, for generating reciprocating motion of the output shaft 24. An intermediate shaft output pinion 36 is mounted on an intermediate shaft 38 to rotate together with intermediate shaft input gear 26 in the drill, and hammer drill modes. Intermediate shafts 28 and 38 could be arranged as the same shaft. Intermediate shaft output pinion 36 drives output gear 22, and causes gear reduction between intermediate shaft 28 and output shaft 24.

Although intermediate shaft input gear 26 is shown rotationally engaged with armature pinion 16, it is to be appreciated that intermediate gear 26 may alternatively be driven via another intermediate gear and pinion between the intermediate gear 26 and armature pinion 16 or several gears and pinions to provide multiple gear reductions. Further, it is to be appreciated that although intermediate pinion 36 is shown to be rotationally engaged with output gear 22, output gear 22 may be alternatively driven via another gear or gears between intermediate pinion 36 and output gear 22.

A second cam mechanism 40 (shown in FIG. 3) having angularly spaced apart impact ramps 42 is affixed to the housing via for example a bearing plate. Second cam mechanism 40 is axially displaceable from first cam mechanism 30 as shown in FIG. 3. More specifically, first and second cam mechanisms 30 and 40, respectively, are engageable by sufficient axial displacement of output shaft 24 so that an impact face of output gear 22 abuts the intermediate gear 26 output face. Further displacement of output shaft 24 will displace intermediate gear 26 so that first and second cam mechanisms 30 and 40, respectively, abut each other.

Reciprocating motion is therefore transmitted by face contact of the appropriate gears. It will be appreciated that there are alternatives to gear face contact that would be apparent to one of ordinary skill in the art. For example, a disk fixed about the midsection of the output gear could abut the intermediate gear output face to perform the same function as the output gear impact face.

First and second cam mechanisms 30 and 40, respectively, are configured with respect to each other to generate reciprocating motion and cause intermediate gear 26 to reciprocate axially as first cam mechanism 30 rotates relative to second mechanism 40. One way to achieve this is through the cooperation of respective impact ramps. The output face of intermediate shaft input gear 26 transmits the reciprocating motion to the impact face of output gear 22. The input face of intermediate shaft input gear 26 is arranged to also define a spring seat. Cam mechanisms 30 and 40 can be selectively disengaged using a rotatable selector rod 44 having different size detents 46 and 48 which act upon the end of the output shaft 24. A suitable biasing means or spring (not shown), such as a Belleville washer, wave washer or the like is positioned on the spring seat and urges the first and second cam mechanisms, 30 and 40 respectively, away from engagement. The cam mechanisms are engageable by displacing the intermediate shaft input gear 26 against the spring bias.

As noted above, switching between conventional drill action and hammer drill action is carried out by rotation of selector rod 44 to allow or prevent the first and second cam mechanisms 30 and 40, respectively, from abutting each other. A pivot hole can be oriented normal to the output shaft axis to receive the adjusting rod in such a manner to permit rotation of the adjusting rod.

In an exemplary embodiment, the motor rotates at about 26,000 rpm. Armature pinion 16 has about seven teeth, while intermediate gear 26 has about thirty-nine teeth. This produces a gear ratio of intermediate gear to armature pinion of about 5.5 to 1. As a result, the intermediate shaft rotates at about 4700 rpm. Intermediate pinion 36 has about nine or ten teeth, while output gear 22 has about thirty-nine or forty teeth. This produces an output gear to intermediate pinion gear ratio of about 4 to 1. The output shaft rotates at about 1000 to 1200 rpm depending on the gear ratios and motor speed. The first cam mechanism 30 rotates with intermediate shaft 38 and preferably has about 11 to 13 impact ramps to produce approximately 60,000 BPM (blows per minute) while maintaining a reduced output shaft speed.

In further accordance with the present invention, a spindle locking arrangement is formed by arranging intermediate shaft output pinion 36 to slide into and out of engagement with intermediate shaft gear 26 under control of an adjust button 50 acting upon a retention ring 52 fixed to the intermediate shaft. A suitable locking arrangement (not shown) can be integrated with adjust button 50 to maintain the button in the desired position. In the drill and hammer modes, the intermediate shaft output pinion gear is forced rearward and keyed into the intermediate shaft input gear 26 by spring force from a spring 54, thereby allowing all gears to rotate.

For chipping mode and/or spindle lock, the intermediate shaft output pinion gear 36 is moved forward and keyed into a gear housing 12 overcoming the force from a spring 54 by moving adjust button 50 to a forward "locked" position. This prevents intermediate shaft output pinion 36, output gear 22 and output shaft 24 from rotating but still allows intermediate gear 26 to rotate and the output gear 22 and spindle 24 to move for and aft to produce a chipping action when the drill is set in the hammer mode and fitted with various types and sizes of wood and masonry chisels.

Each mode and positioning of the adjust button is shown FIGS. 1–. More specifically, FIG. 1 illustrates the spindle lock/chipping mode, FIG. 2 illustrates the hammer/drill mode, and FIG. 3 illustrates the drill only mode. The spindle lock mode is particularly useful because locking of the output shaft facilitates tightening or loosening of the drill chuck when the drill is equipped with a keyless-type chuck.

Figure 4:
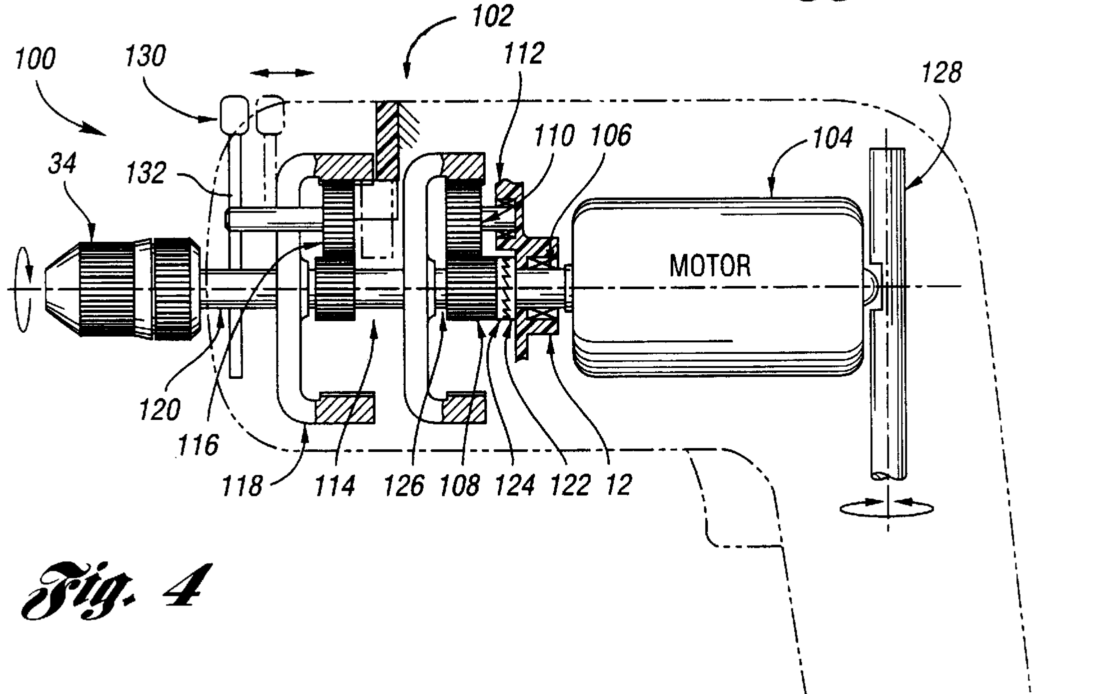
FIG. 4 is a side view schematic representation of a hammer drill having a two stage planetary gear arrangement in accordance with a second embodiment of the present invention.
Figure 5:
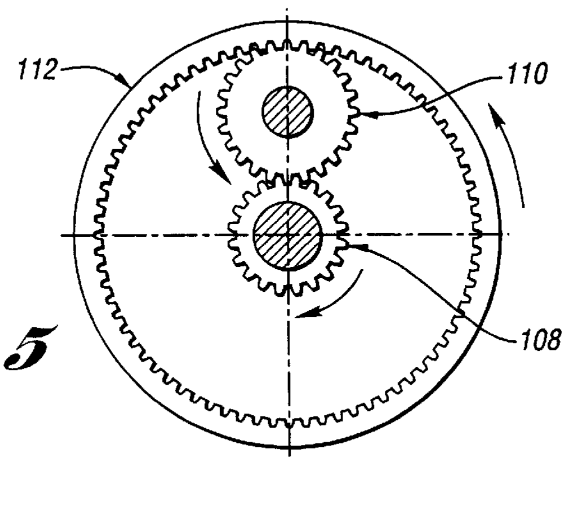
FIG. 5 is a front face view of the planetary gear arrangement of the hammer drill of FIG. 4.

Referring now to FIGS. 4 and 5, a second hammer drill 100 of the present invention utilizes a two-stage planetary gear arrangement generally designated as 102. A motor 104 rotates a motor drive shaft 106 having a pinion gear 108 mounted at the outer end. Pinion gear 108 operates as a sun gear in the first stage of the planetary gear set. A planet gear 110 interacts with the sun gear 108 to drive an outer gear ring 112, which is coupled to drive a second stage sun gear 114 of the second stage of the planetary gear set. Second stage sun gear 114 subsequently drives a second stage planet gear 116 to rotate a second stage gear ring 118. Second stage gear ring 118 is connected to rotate an output shaft 120 having a chuck 34 coupled thereto.

An impact mechanism is formed by mounting a first impact cam 122 to the housing 12, and a second impact cam 124 to an inner face of the pinion gear 108. Pinion gear 108 is then able to make reciprocating contact on an opposing surface 126 of the first stage ring gear 112, which in turn causes reciprocating action of the output shaft via a contact surface on sun gear 114 and gear ring 118. The motor shaft 106 is arranged to be locked into an outward extending position so as to maintain separation between impact cams 122 and 124, or to be unlocked (as shown) to allow the shaft to reciprocate in an axially direction as the impact cams interact. This locking action is manually controlled to enable or disable the hammering mode by placing a suitable adjust lever on selector rod 128 with detents to maintain engagement with the motor shaft 106 in the drill mode.

A spindle locking mechanism is also provided to allow the hammer drill be used in the chipping mode by adapting the second stage planet gear 116 to be axially moveable out of engagement with the second stage sun gear 114 and/or second stage ring gear 118 under control of a lever 130 acting upon planet gear carrier 132. Such an arrangement can include a spring biased keying design similar to that provided for the intermediate shaft of FIGS. 1–3. Thus, the two stage planetary gear arrangement of embodiment 100 provides a relatively large gear reduction ratio without any effect on the ability to attain a high BPM in the hammer mode. Such an arrangement is particularly useful in cordless drills where higher speed motors are typically utilized and a compact design is desired.

Figure 6:
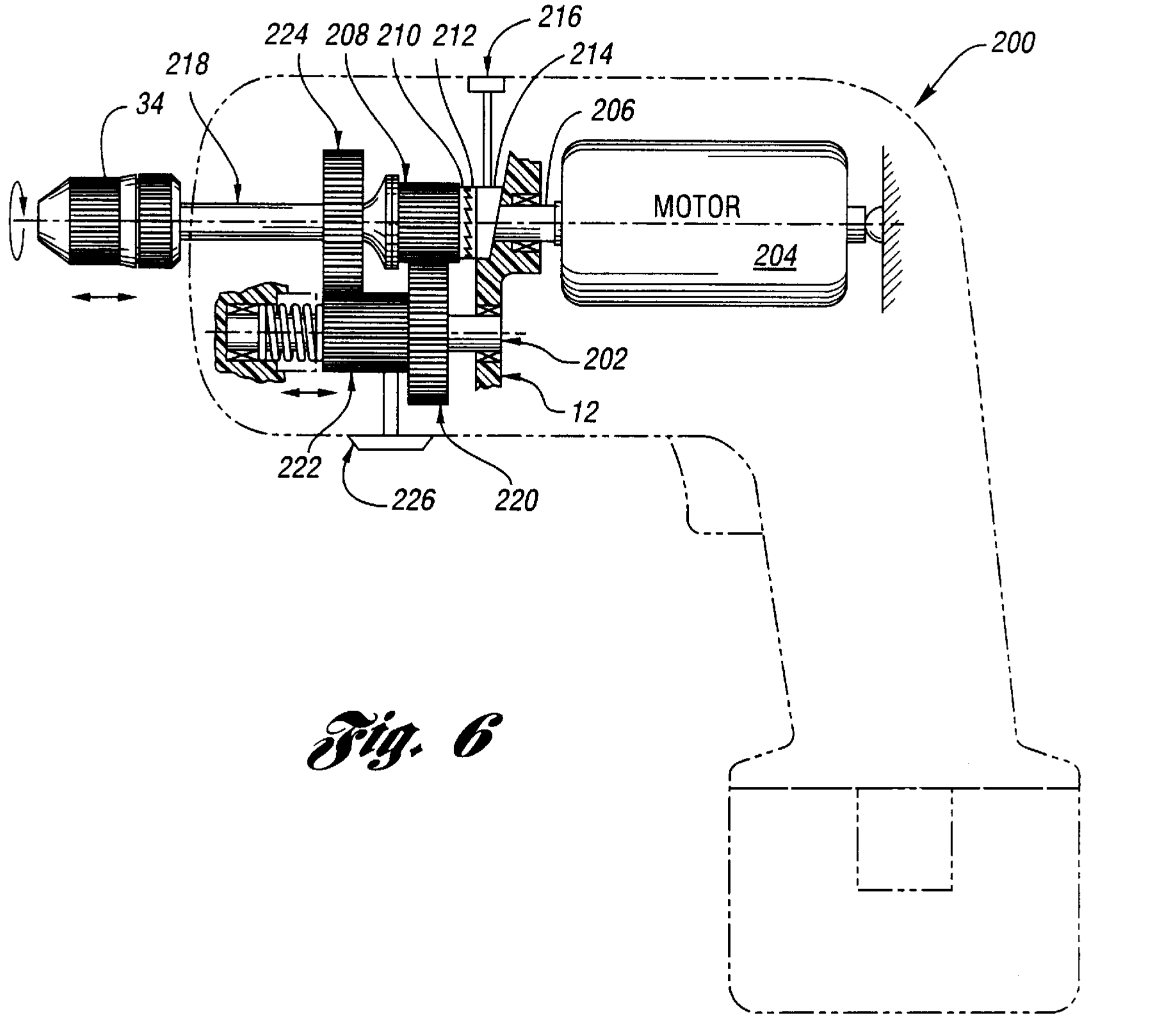
FIG. 6 is a side view schematic representation of a hammer drill having a two stage gear reduction arrangement using a single intermediate shaft in accordance with a third embodiment of the present invention.

Referring to FIG. 6, a third embodiment of the present invention is illustrated in hammer drill 200. Hammer drill 200 utilizes a two-stage gear reduction mechanism in a single intermediate shaft 202. Motor 204 is provided with a motor output shaft 206 which has a non-cylindrical end port (not shown) preferably of a spline or a double D configuration. Motor output shaft 206 drives motor pinion gear 208. The pinion gear rotates with motor output shaft 206 that is free to axially move relative thereto due to the inner fitting non-cylindrical cooperating surfaces respectively formed thereon.

Affixed to and integrally formed as part of the motor pinion gear 208 is first impact cam 210 which provides a series of radially extending impact ramps similar to first cam mechanism 30 described in reference to the first embodiment 10. The first impact cam 210 in the present embodiment cooperates with a second impact cam 212 which circumaxially extends about but is not affixed to motor output shaft 206. Second impact cam 212 is affixed relative to housing 12 so as to prevent its rotation about the motor output shaft. The second impact cam 212 however can be moved axially into and out of engagement with the first impact cam by a wedge shaped shift fork 214 which is shifted radially relative to the motor output shaft 206 by an actuator 216 engageable by the user of the hand drill. Shift fork 214 is configured with two legs which can slide down an inclined surface to rest about shaft 206. The fork is manually shiftable between an inboard hammer position (illustrated) in which the first and second impact cams are forced into cooperation with one another so that the output face of a motor pinion gear 208 closest to chuck 34 axially engages output shaft 218, and an outport position where first and second impact cams 210 and 212 move axially apart and the end of output shaft 218 bears axially against motor output shaft 206 enabling the motor output shaft to freely rotate without axial oscillation.

Gear reduction between the relatively high speed motor 204 and the low speed output shaft 218 is achieved by a two-stage gear reduction utilizing intermediate shaft 202. Motor drive pinion 208 drives the intermediate shaft input gear 220 which in turn drives intermediate shaft output gear 222 which is shown engaged thereto in FIG. 6. Intermediate shaft output gear 222 in turn drives output gear 224 which is rotatably affixed to output shaft 218. In the hammer drill mode, rotation of the motor causes output shaft 218 and associated chuck 34 to rotate as well as axially oscillate. Output gear 224 can either axially oscillate relative to intermediate shaft output gear 222 or preferably in order to minimize gear wear, output gear 224 can be rotatably affixed but free to axially slide relative to output shaft 218 utilizing cooperating non-cylindrical surfaces such as a spline or one more flats formed on cooperating surfaces of the output gear 224 and output shaft 218.

Hammer drill 200 is to further include a chipping mode where output shaft 218 axially oscillates but does not rotate. A chipping mode actuator 226 is provided to enable to the user to axially slide intermediate shaft output gear 222 along intermediate shaft 202 out of engagement with intermediate shaft input gear 220. Once the intermediate shaft output gear 222 is fully disengaged from intermediate shaft input gear, it will cooperate with a socket formed in housing 12 in order to prohibit intermediate shaft output gear rotation. Once the intermediate shaft output gear is disengaged from rotation and locked to housing 12, output gear 224 and output shaft 218 are similarly locked so that they will not rotate. Then, when motor 204 is operated causing the motor output shaft and associated motor pinion gear 208 to rotate from the shift fork 214 in the inboard hammer mode position, the hammer drill 200 will operate in the chipping mode causing output shaft 218 and associated chuck 34 to axially oscillate while being held in an affixed rotary orientation. It is to be appreciated that the hammer drill 200 illustrated in FIG. 6 can be alternatively made without the above-described chipping mode feature. This is accomplished simply by eliminating the chipping mode actuator 226 and potentially simplifying the intermediate shaft and intermediate shaft and gear construction.

With this embodiment, because the bpm is the difference between the high speed motor output shaft 208 and the stationary housing 12 as opposed to the intermediate shaft, embodiment 200 produces even higher bpms than embodiment 10 when the drill is in the hammer or chipping mode without requiring any corresponding change in output shaft speed.

Figure 7:
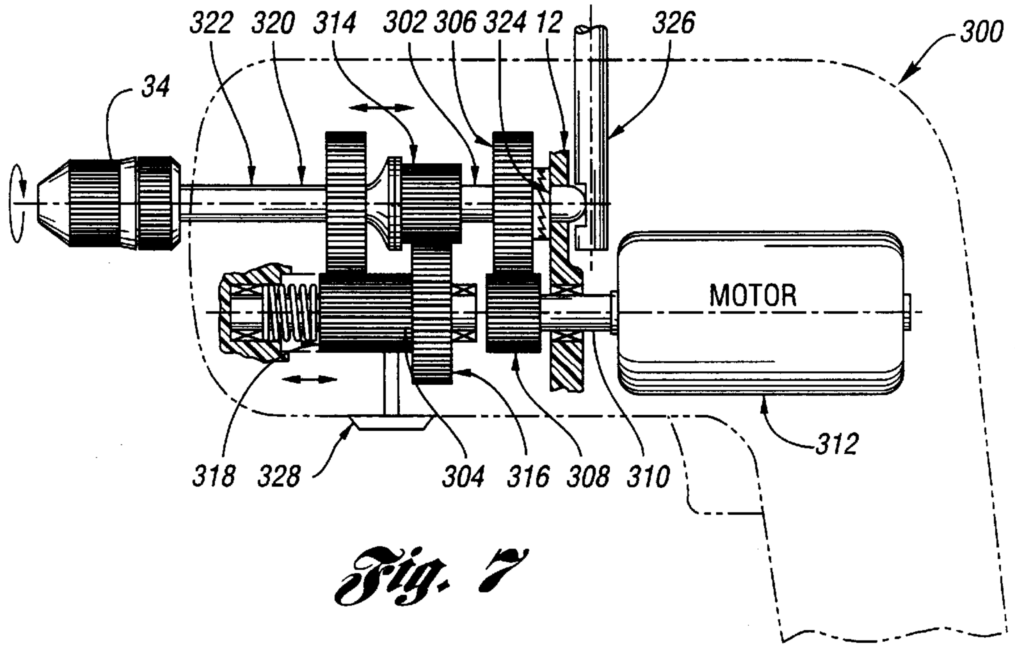
FIG. 7 is a side view schematic representation of a hammer drill having a three stage gear reduction arrangement using two intermediate shafts in accordance with a fourth embodiment of the present invention.

Referring now to FIG. 7, a fourth embodiment 300 of the present invention utilizes a three-stage gear reduction arrangement having two intermediate shafts, first shaft 302 and second shaft 304. The intermediate first shaft 302 includes a first shaft input gear 306 which engages a motor pinion gear 308 located on an output shaft 310 of motor 312, and a first shaft output gear 314 which drives a second shaft output gear 316 affixed to the intermediate second shaft 304. A second shaft output gear 318 is mounted on the intermediate second shaft 304 to drive an output gear 320 rotatably affixed to output spindle 322. A chuck 34 is attached to the end of output spindle 322 as described previously.

In this embodiment, a first impact cam 324 is located on a surface of intermediate gear 306 facing housing 12, and a second impact cam 326 is affixed to the housing opposed from and in alignment with the first impact cam 324. An adjust lever 326 is provide to selectively lock impact cams 324 and 326 either into or out of engagement. When the impact cams are locked into engagement, rotation of gear 306 causes the impact cams to ratchet and reciprocate intermediate shaft 302. This reciprocating action in turn causes contact between the end of intermediate shaft 302 and output spindle 322 to provide a corresponding reciprocating action on the output spindle.

In order to provide spindle locking, the output spindle 322 can be locked into nonrotation in a similar manner to the embodiments shown in FIGS. 1–3 and 6. More specifically, a manually operated adjust lever 328 allows the intermediate second shaft 304 to be axially displaced to move pinion gear 318 into or out of engagement with output gear 320. Thus, embodiment 300 allows for greater gear reduction without any reduction in the ability to attain a high bpm in the hammer mode. As with the embodiment shown in FIG. 4, such an arrangement is particularly useful with cordless drills where higher speed type motors are typically employed or in industrial drill applications using large low speed drill bits.

Thus, it will be appreciated that each embodiment of the present invention accomplishes a desired high blows per minute (BPM) for efficient hammer drill performance without requiring an undesirable high output speed or costly two-speed gear train, while also allowing the drill to be placed in a hammer only mode suitable for chipping operation. This is accomplished by incorporating the impact mechanism into a stationary structure and a displaceable gear driven at an intermediate gear stage speed instead of the output shaft speed. Because of the higher rpm at an intermediate stage, the number of ramps that control the axial movement to produce the hammering action can be reduced. This allows a greater degree of ramp surface area contact with every revolution and reduces the "skipping" effect.

While the best mode for carrying out the invention has been described in detail, those familiar with the art to which this invention relates will recognize various alternative designs and embodiments for practicing the invention as defined by the following claims.

What is claimed is:

1. A hammer drill capable of operation in a hammer drill mode, a drill-only mode, and a chipping mode comprising:

a housing;

a motor disposed in the housing and having a rotatable armature shaft, the armature shaft having an armature pinion at one end, an axially displaceable output shaft having an outer end adapted to receive a drill chuck;

an output gear fixed about the output shaft to rotate coaxially therewith;

an intermediate gear reduction arrangement comprising at least a two stage gear reduction arrangement having a first gear engaged with the armature pinion, an axially displaceable second gear engaged with the output gear, a first intermediate shaft to which the second gear is affixed, a rotation control mechanism for selectively displacing the first intermediate shaft to move the second gear out of engagement with the first gear to prevent rotation of the output shaft to place the drill into the chipping mode, and a second intermediate shaft to which the first gear is affixed;

an axially displaceable first cam mechanism to be driven by the armature shaft; and a second cam mechanism affixed to the housing, the first and second cam mechanisms being engageable by selectively displacing the first cam mechanism to cause the first and second cam mechanisms to abut each other, wherein the first and second cam mechanisms are configured with respect to each other and the intermediate gear reduction arrangement to generate reciprocating motion in response to rotation of the armature shaft and cause the first gear to transmit the reciprocating motion to the output gear thereby axially reciprocating the output shaft irrespective of whether the second gear is in engagement with the first gear, wherein the first cam mechanism is located on the first gear, and the second intermediate shaft is axially displaceable to move the first and second cam mechanisms into and out of engagement.

2. The hammer drill of claim 1 wherein the first cam mechanism includes a plurality of ramps angularly spaced about a face of the first gear.

3. The hammer drill of claim 1 wherein the rotation control mechanism comprises a manually actuated adjust button which locks the position of the second gear to the desired mode of operation.

* * * * *